United States Patent

Lardy et al.

[11] Patent Number: 5,970,704
[45] Date of Patent: Oct. 26, 1999

[54] PIVOTING DOOR THRUST REVERSER WITH SLIDING PANEL

[75] Inventors: Pascal Lardy; Laurent Georges Valleroy, both of Le Havre, France

[73] Assignee: Societe Hispano-Suiza, Paris, France

[21] Appl. No.: 08/895,088

[22] Filed: Jul. 15, 1997

[30] Foreign Application Priority Data

Jul. 18, 1996 [FR] France ................................. 96.08991

[51] Int. Cl.$^6$ ........................................................ F02K 3/02
[52] U.S. Cl. ........................ 60/226.2; 60/230; 239/265.37
[58] Field of Search ................................. 60/226.2, 229, 60/230, 262; 239/265.33, 265.37; 244/110 B

[56] References Cited

U.S. PATENT DOCUMENTS

| | | |
|---|---|---|
| 3,279,182 | 10/1966 | Helmintoller . |
| 3,601,992 | 8/1971 | Maison ...................................... 60/230 |
| 3,605,411 | 9/1971 | Maison et al. . |
| 4,894,985 | 1/1990 | Dubois et al. . |
| 4,960,243 | 10/1990 | Dubois et al. . |
| 5,039,171 | 8/1991 | Lore . |
| 5,046,307 | 9/1991 | Matta et al. . |
| 5,090,197 | 2/1992 | Dubois . |
| 5,120,004 | 6/1992 | Matthias . |
| 5,297,387 | 3/1994 | Carimali et al. . |
| 5,819,528 | 10/1998 | Masson ................................ 239/265.33 |
| 5,852,928 | 12/1998 | Vauchel ................................... 60/226.2 |

FOREIGN PATENT DOCUMENTS

| | | |
|---|---|---|
| 0 365 425 | 4/1990 | European Pat. Off. . |
| 0 413 635 | 2/1991 | European Pat. Off. . |
| 0 414 609 | 2/1991 | European Pat. Off. . |
| 1482538 | 5/1967 | France . |
| 2030034 | 10/1970 | France . |
| 2618853 | 2/1989 | France . |
| 2629135 | 9/1989 | France . |
| 2680547 | 2/1993 | France . |

*Primary Examiner*—Charles G. Freay
*Attorney, Agent, or Firm*—Bacon & Thomas PLLC

[57] ABSTRACT

A thrust reverser is disclosed for a turbojet engine having a cowling with an inner cowling surface forming an outer boundary of a gas flow duct through which gases flow from a front towards a rear portion, the cowling having an outer cowling surface and at least one reverse thrust opening communicating with the gas flow duct. The thrust reverser has a thrust reverser door pivotally connected to the cowling so as to move between a forward thrust position and a reverse thrust position, the thrust reverser door having front and rear edge portions, an outer door surface and an inner door surface with at least one of the outer and inner door surfaces being flush with at least one of the corresponding outer and inner cowling surfaces when the thrust reverser door is in the forward thrust position. The thrust reverser also has at least one thrust reversing panel having an outer panel surface and an inner panel surface mounted on the thrust reverser door so as to move along a linear path of movement relative to the thrust reverser door as the thrust reverser door moves between the forward and thrust portions. When the thrust reverser door is in the forward thrust position, the inner panel surface is flush with the inner cowling surface and forms a portion of the boundary of the gas flow duct.

9 Claims, 7 Drawing Sheets

PIVOTING DOOR THRUST REVERSER WITH SLIDING PANEL

BACKGROUND OF THE INVENTION

The present invention relates to a pivoting door thrust reverser for a turbojet engine, more particularly to such a thrust reverser having a panel slidably mounted on the pivoting thrust reverser door.

Turbofan-type turbojet engines are well known in the art and typically comprise a fan at the front of the turbojet engine which directs a flow of bypass air through a duct bounded on the inside by the engine cowling and on the outside by a fan cowling. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

Figure 1:
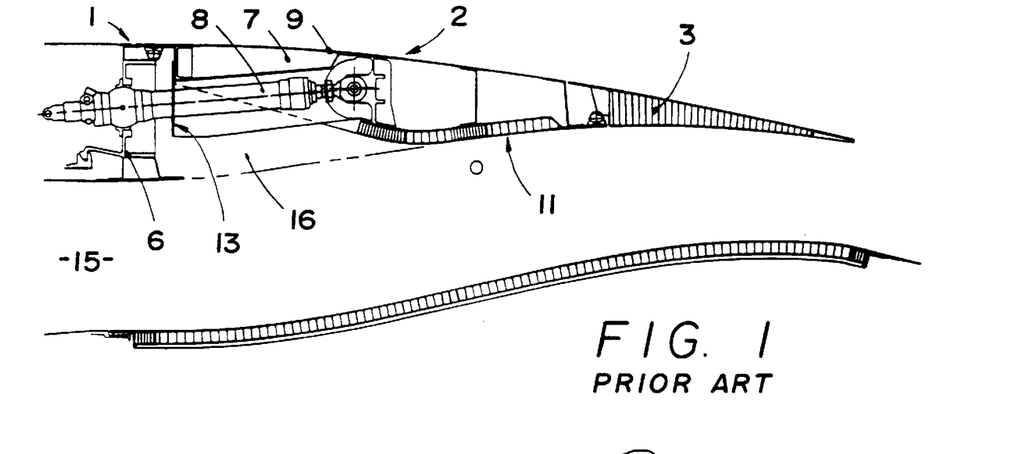
FIG. 1 is a partial, longitudinal cross-sectional view illustrating a known thrust reverser in the forward thrust position.
Figure 2:
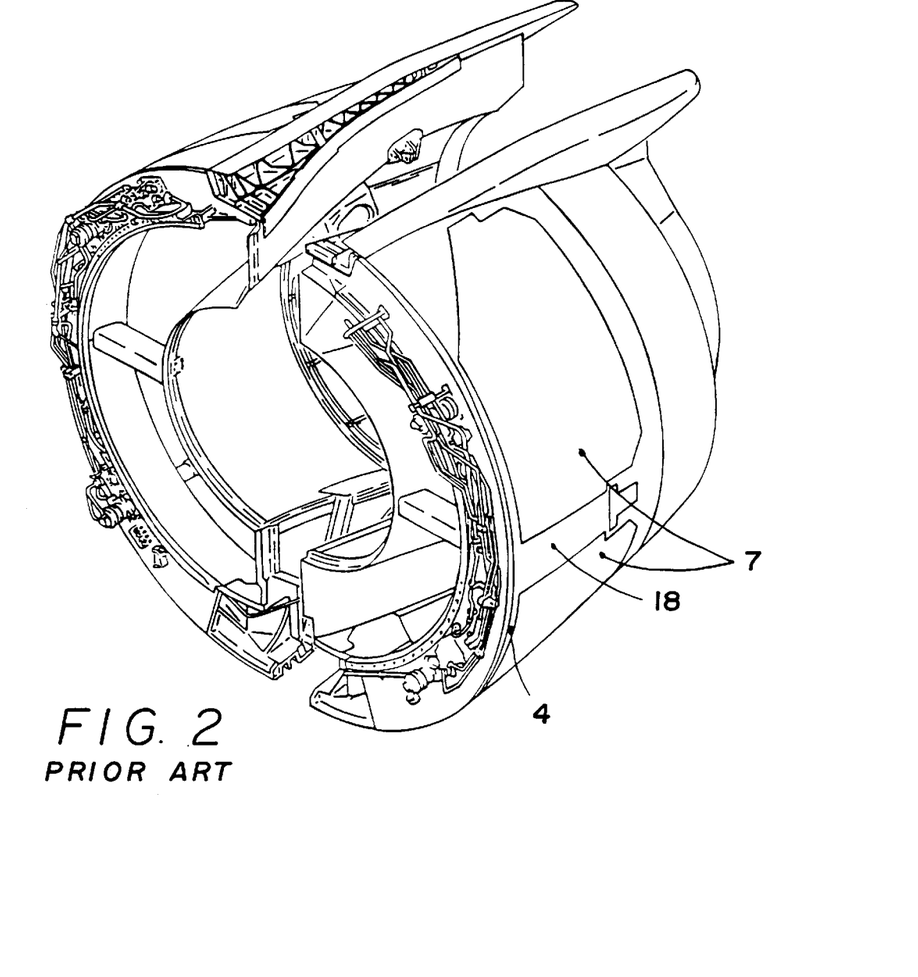
FIG. 2 is a perspective view of a cowling incorporating the known thrust reverser illustrated in FIG. 1.

FIGS. 1 and 2 illustrate a known pivoting door-type thrust reverser associated with the fan cowling of a turbofan-type turbojet engine. As illustrated in FIG. 1, an upstream portion of the fan cowling 1 which defines the outer limits of the bypass flow duct is generally concentrically arranged about the turbojet engine (not shown) and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct 15 through which the bypass flow air passes.

The fan cowling also comprises a thrust reverser, illustrated generally at 2, and a downstream fairing 3. The thrust reverser 2 comprises a door 7 pivotally attached to the cowling 1 such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct 15 so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends from an upstream portion 4 of the cowling axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

French Patent 1,482,538 also discloses the use of a linear actuator affixed to the stationary upstream portion of the cowling and to the pivoting thrust reverser door at a point in an upstream portion of the door.

As noted previously, the presence of the cavity 16 when the thrust reverser door 2 in its forward thrust position will create disturbances in the gases flowing through the duct 15 and thereby degrade engine performance in the forward thrust mode.

SUMMARY OF THE INVENTION

A thrust reverser is disclosed for a turbojet engine having a cowling with an inner cowling surface forming an outer boundary of a gas flow duct through which gases flow from a front towards a rear portion, the cowling having an outer cowling surface and at least one reverse thrust opening communicating with the gas flow duct. The thrust reverser has a thrust reverser door pivotally connected to the cowling so as to move between a forward thrust position and a reverse thrust position, the thrust reverser door having front and rear edge portions, an outer door surface and an inner door surface with at least one of the outer and inner door surfaces being flush with at least one of the corresponding outer and inner cowling surfaces when the thrust reverser door is in the forward thrust position. The thrust reverser also has at least one thrust reversing panel having an outer panel surface and an inner panel surface mounted on the thrust reverser door so as to move along a linear path of movement relative to the thrust reverser door as the thrust reverser door moves between the forward and thrust portions. When the thrust reverser door is in the forward thrust position, the inner panel surface is flush with the inner cowling surface and forms a portion of the boundary of the gas flow duct.

The configurations of the inner door surface in conjunction with the inner panel surface, or the inner panel surface alone, will form a smooth, aerodynamic gas flow path between the forward portion of the cowling and the rear portion of the cowling, thereby eliminating the formation of the cavity 16 which, in the prior devices, causes disturbances in the gases flowing through the duct. Since the panel moves along a linear path relative to the thrust reverser door, movement of the thrust reverser door to the reverse thrust position causes movement of the panel such that the panel does not deleteriously effect the redirection of the gases in the reverse thrust direction.

An object of the invention is to assure the aerodynamic continuity of the inner and outer surfaces of the cowling when the thrust reverser is in the forward thrust position. Another object is to provide optimal clearance in the cowling during thrust reversal operation, while at the same time avoiding any interference with the ground, the engine mounting pylon, or the aircraft structure when moving into the reverse thrust position. The present design makes possible higher operational safety while, at the same time, decreases the weight of the structure and improves overall performance. In a first embodiment of the invention, the sliding panel covers the outer surface of the pivoting thrust reverser door and has a forward portion forming the inner panel surface which, along with the inner door surface provides a smooth, aerodynamic boundary to the gas flow duct. In the forward thrust position, the outer panel surface is flush with the outer cowling surface. A connecting linkrod connects the panel to the downstream portion of the cowling such that, as the thrust reverser door pivots into the reverse thrust position, the panel slides linearly relative to the door.

In a second embodiment, a pair of panels are mounted on the door, each panel having an inner panel surface to form a portion of the boundary of the gas flow duct in a smooth, aerodynamic fashion when the thrust reverser door is in the forward thrust position. In this position, the outer door surface is flush with the outer cowling surface. When the door pivots into the reverse thrust position, the panels slide relative to the door in opposite directions.

In a third embodiment, the outer panel surface is covered by the thrust reverser door in the forward thrust position, while the inner panel surface and the inner door surface are flush with the inner cowling surface to provide a smooth boundary to the gas flow duct. When the door moves to the reverse thrust position, the panel slides linearly relative to the door so as to extend beyond the front portion of the thrust reverser door. In its extended position, the panel forms a deflector to further deflect the redirected gases to provide an enhanced reverse thrust effect.

DETAILED DESCRIPTION OF THE PREFERRED EMBODIMENTS

The thrust reverser according to the present invention is utilized, as in the prior art devices, in conjunction with a cowling 1 having an upstream portion and a downstream portion 3 and which has an inner surface forming an outer boundary of a gas flow duct 15.

Figure 3:
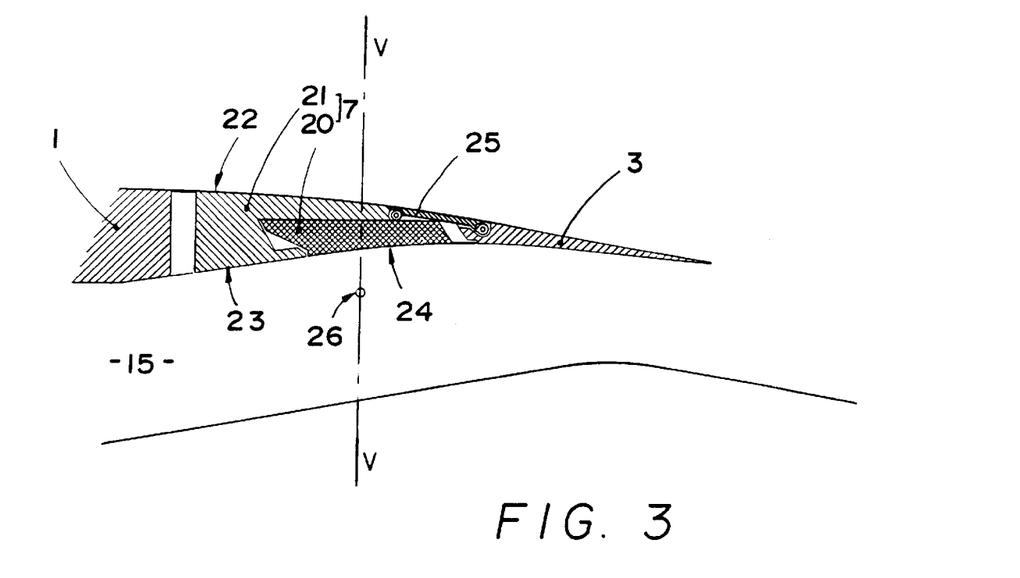
FIG. 3 is a partial, longitudinal cross-sectional view of a first embodiment of the thrust reverser according to the present invention with the thrust reverser in the forward thrust position.
Figure 4:
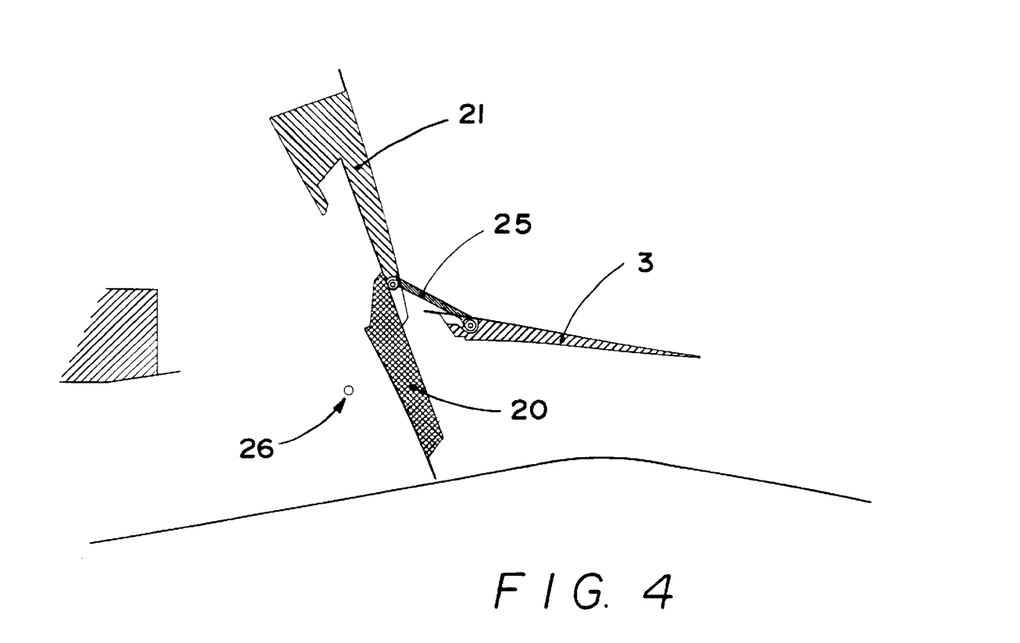
FIG. 4 is a view corresponding to FIG. 3, but illustrating the thrust reverse in the reverse thrust position.
Figure 5:
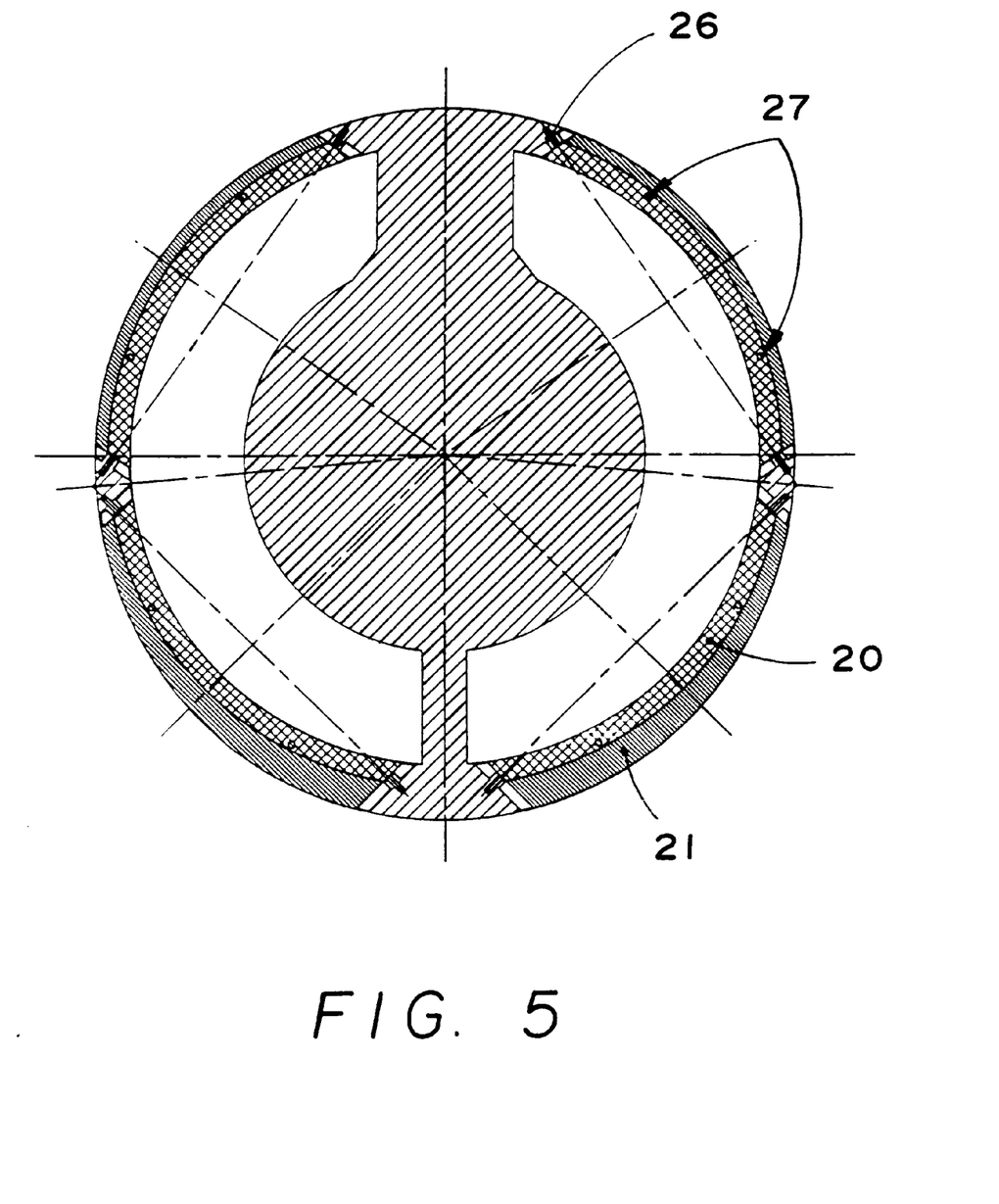
FIG. 5 is a cross-sectional view taken along line V—V in FIG. 3.
Figure 6:
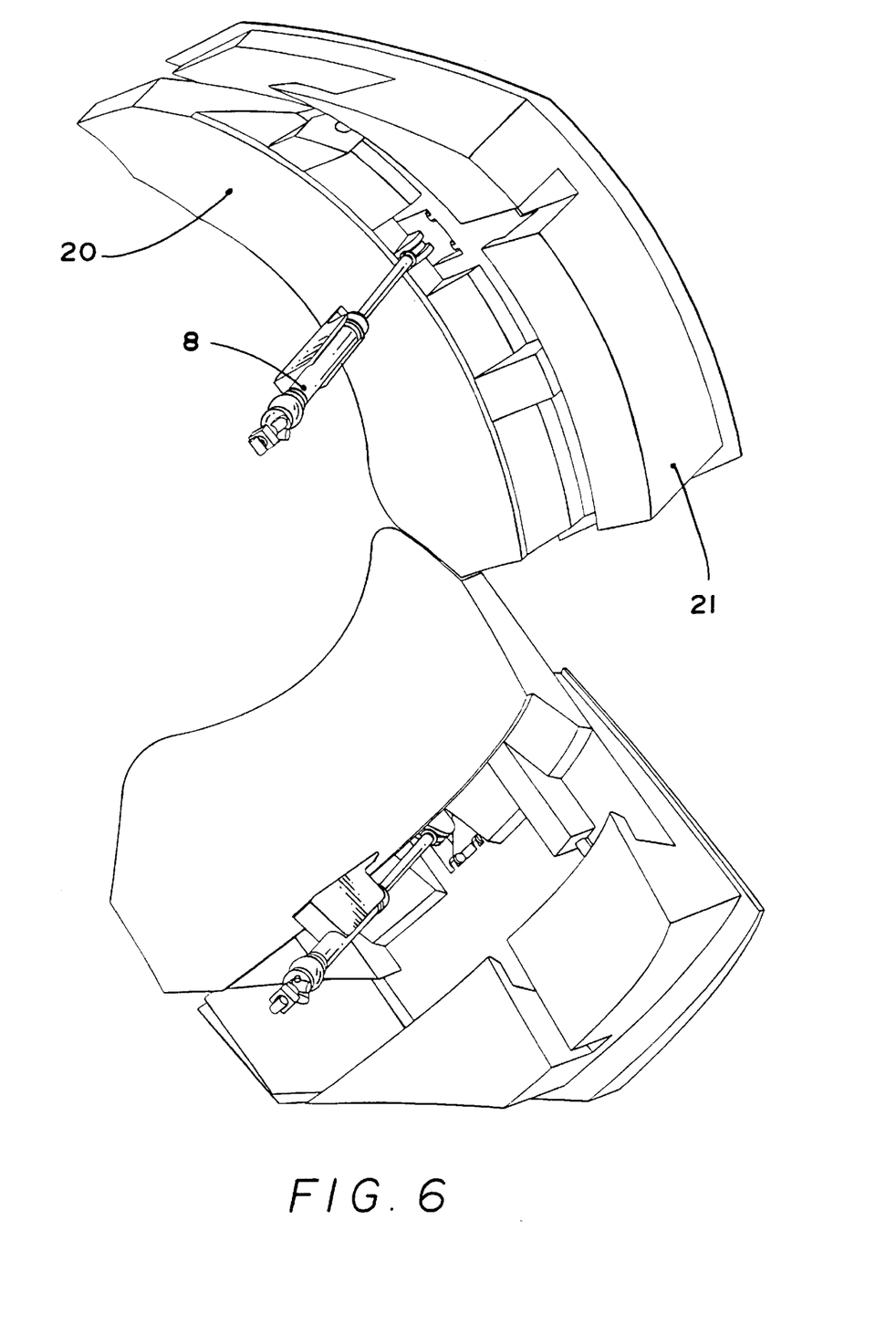
FIG. 6 is a perspective view of thrust reverser doors and panels according to FIG. 3 with the doors and panels in their reverse thrust positions.

In a first embodiment of the invention, illustrated in FIGS. 3–8, the thrust reverser 7 comprises a pivoting thrust reverser door 20 pivotally attached to the cowling 1 so as to pivot about axis 26 between a forward thrust position, illustrated in FIG. 3, and a reverse thrust position, illustrated in FIG. 4. A panel 21 is slidably attached to the thrust reverser door 20, the panel 21 having an outer panel surface 22 and an inner panel surface 23. As can be seen in FIG. 3, the panel 21 is configured such that, when the thrust reverser door 20 is in the forward thrust position, the outer panel surface 22 is flush with the outer cowling surface and the inner panel surface 23, in conjunction with the inner door surface 24, are flush with the inner cowling surfaces so as to form a substantially smooth, aerodynamic outer boundary for the gas flow duct 15. The configuration of the panel 21 and the door 20 are such that no cavity 16 is formed as in the prior art thrust reversers. A linkrod 25 connects the panel 21 to the downstream portion 3 of the cowling 1 such that, as the thrust reverser door 20 pivots from the forward thrust position into the reverse thrust position, illustrated in FIG. 4, by the use of a known control actuator 8 as in the prior art devices, the panel 21 will slide linearly relative to the thrust reverser door 20 so as to further extend from a front portion of the thrust reverser door 20. The relative positions of the thrust reverser doors 20 and the panels 21 when in their reverse thrust positions are also illustrated in FIG. 6. By extending forwardly of the thrust reverser door 20, the panel 21 acts as a deflector to further deflect the gas redirected by the thrust reverser door 20 into a forward direction, thereby enhancing the thrust reversing effect.

Figure 7:
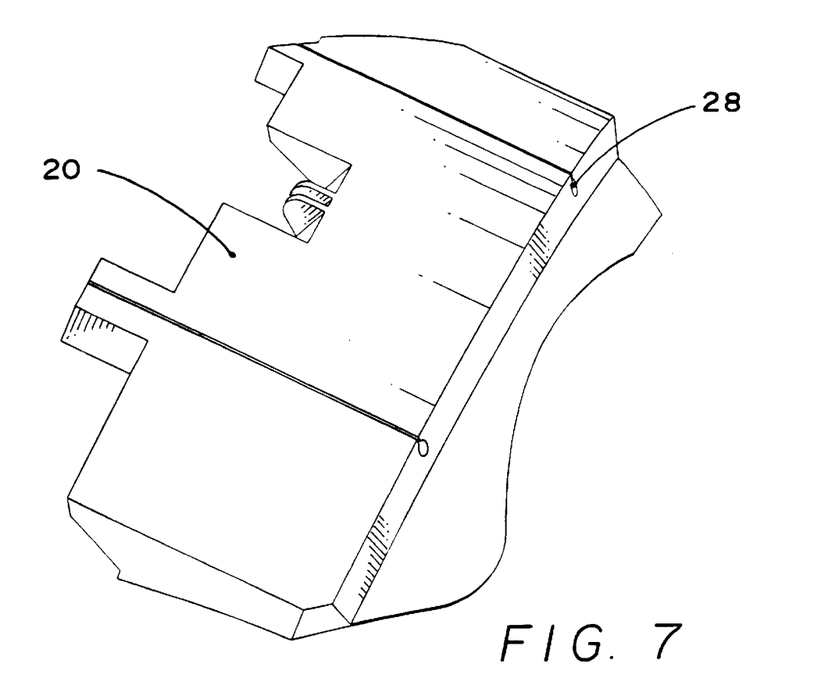
FIG. 7 is a perspective view of the thrust reverser door illustrated in FIG. 3.
Figure 8:
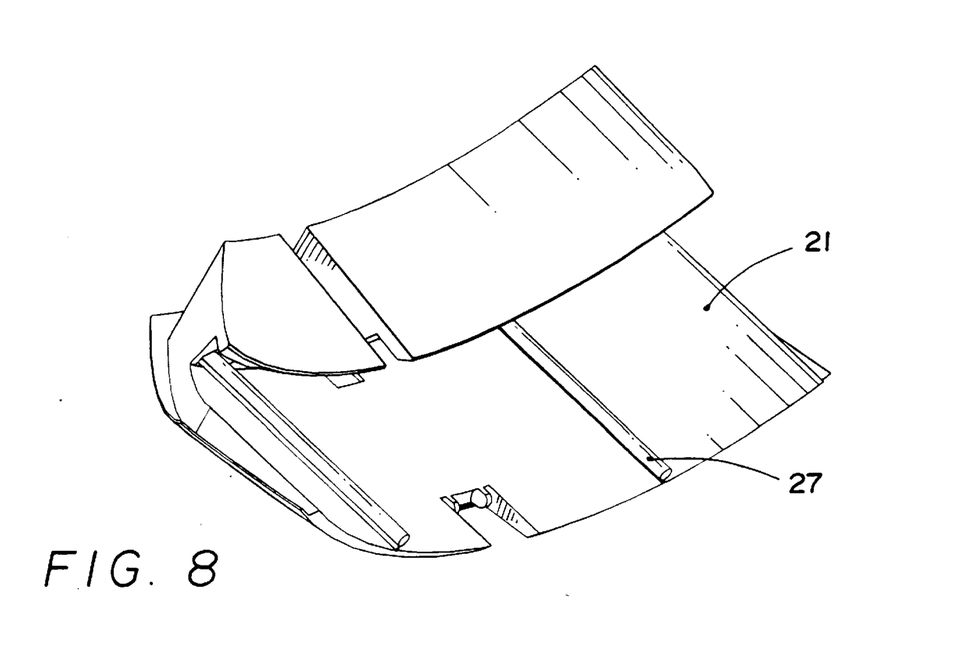
FIG. 8 is a perspective view of the sliding panel utilized in the thrust reverser illustrated in FIG. 3.

The panel 21 is slidably affixed to the thrust reverser door 20 so as to move in a linear direction relative to the thrust reverser door 20. As illustrated in FIGS. 7 and 8, the attachment may comprise one or more grooves 28 formed in the thrust reverser door 20 which are engaged by one or more rails 27 formed on the panel 21. The rails 27 may be formed on the thrust reverser door 20 and the grooves formed in the panel 21 without exceeding the scope of this invention.

Figure 9:
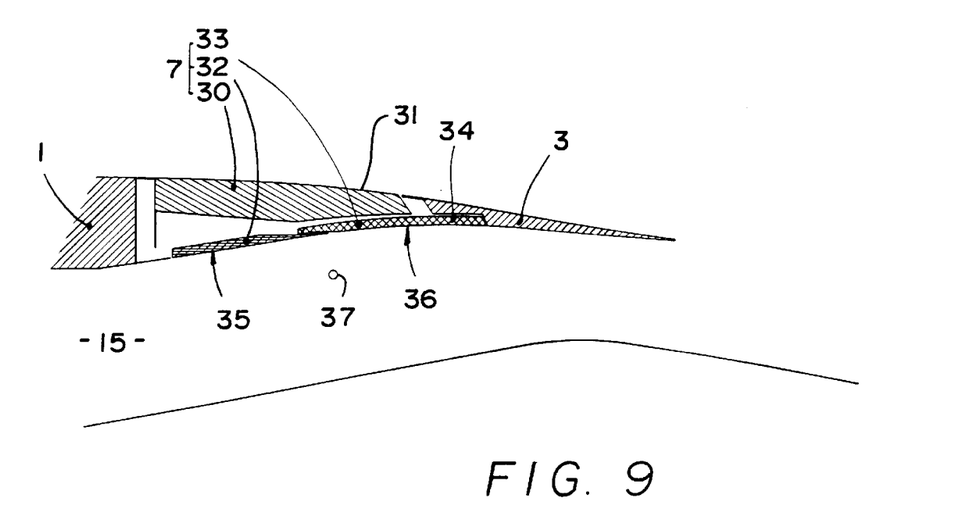
FIG. 9 is a partial, longitudinal cross-sectional view illustrating a second embodiment of the present invention in which the thrust reverser is in the forward thrust position.
Figure 10:
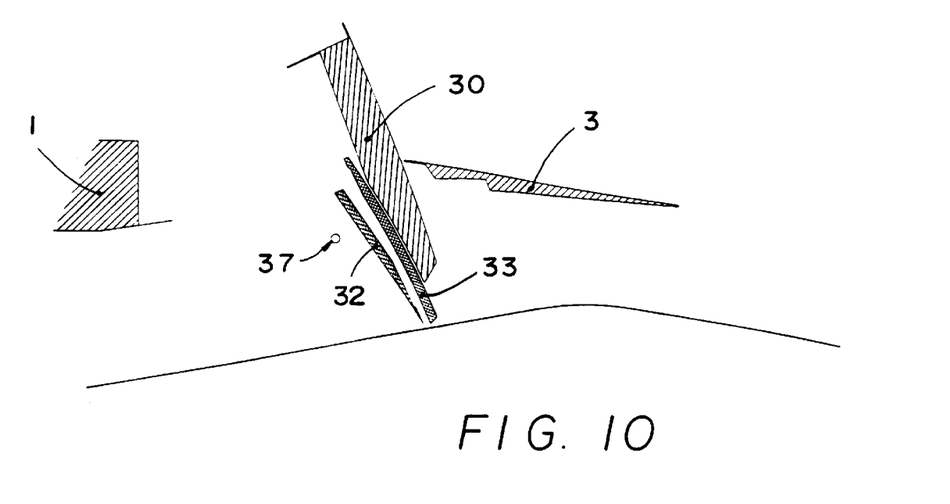
FIG. 10 is a view corresponding to FIG. 9, but illustrating the thrust reverser in the reverse thrust position.

A second embodiment of the invention is illustrated in FIGS. 9 and 10. In this embodiment, a thrust reverser door 30 is, again, pivotally attached to the cowling 1 so as to pivot about axis 37 between a forward thrust position, illustrated in FIG. 9, and a reverse thrust position, illustrated in FIG. 10. As can be seen, in the forward thrust position, the outer door surface 31 is flush with the outer cowling surface to provide a smooth, aerodynamic contour. In this embodiment, a pair of panels, 32 and 33, are attached to each of the thrust reverser doors 30 so as to each move in a linear direction relative to the thrust reverser door 30 as it moves between the forward and reverse thrust positions. When thrust reverser door 30 is in the forward thrust position, the inner panel surfaces 35 and 36 on the panels 32 and 33, respectively, are substantially flush with each other and flush with the inner cowling surface so as to provide a smooth, aerodynamic boundary to the gas flow duct 15 without the formation of any cavities 16 as in the prior art devices. A rear portion 34 of panel 33 extends rearwardly of the rear edge portion of the thrust reverser door 30 and is covered by an inner portion of the rear cowling portion 3. Aside from the portion of panel 33 extending rearwardly of the rear edge portion of thrust reverser door 30, the thrust reverser door 30 covers the outer panel surfaces of panels 32 and 33.

When the thrust reverser door 30 pivots toward the reverse thrust position, illustrated in FIG. 10, the rear panel 33 slides relative to the thrust reverser door 30 toward the front edge portion of the thrust reverser door 30, while forward panel 32 slides relative to the thrust reverser door 30 toward the rear edge portion of the thrust reverser door, such that panel 33 is interposed between the front panel 32 and the thrust reverser door 30 when the door reaches its reverse thrust position. Panels 32 and 33 thus comprise a baffle deflecting the gases flowing through the duct 15 through the reverse thrust opening in the cowling 1. The sliding motion of the panels 32 and 33 relative to the thrust reverser door 30 may be implemented by means known per se, such as a linear actuator, or a mechanical linkrod system. Since these elements are known, no details are illustrated.

Figure 11:
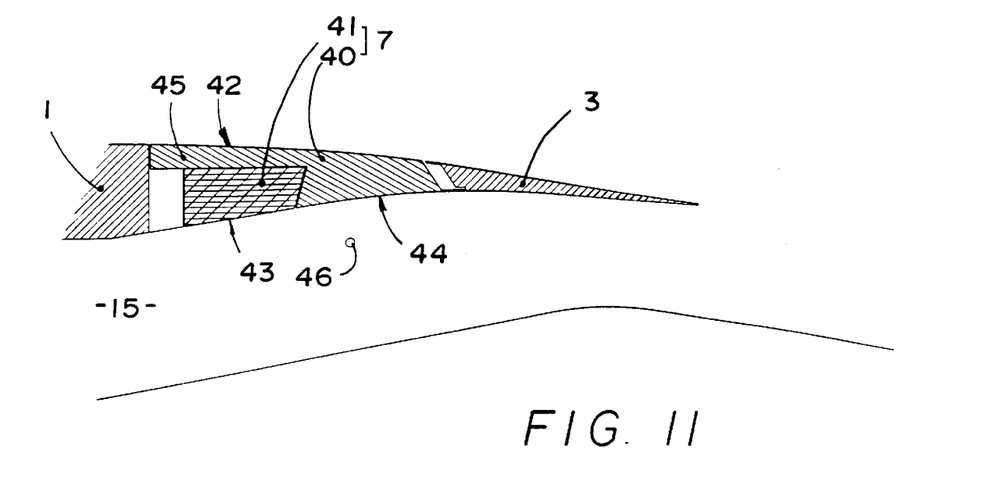
FIG. 11 is a partial, longitudinal cross-sectional view illustrating a third embodiment of the present invention with the thrust reverser in the forward thrust position.
Figure 12:
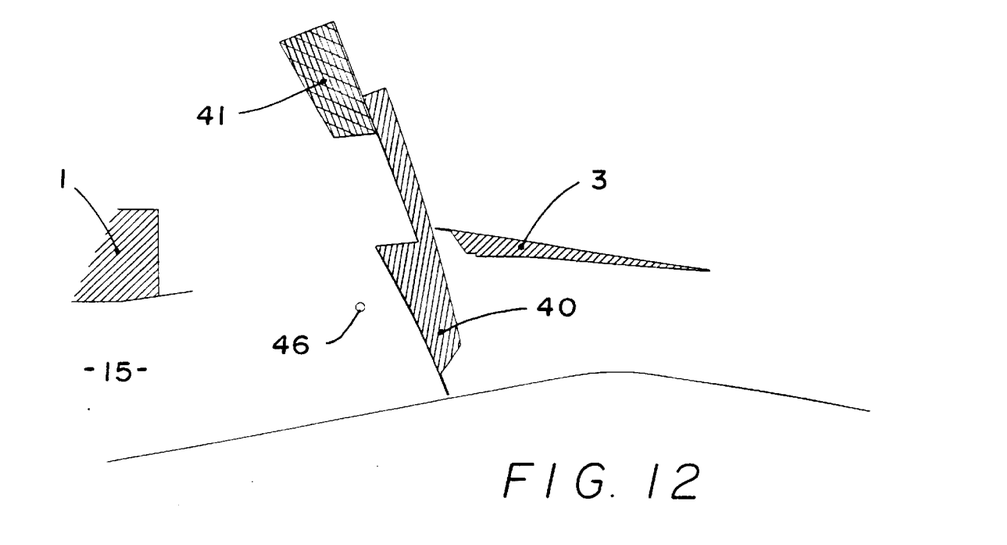
FIG. 12 is a view corresponding to FIG. 11, but illustrating the thrust reverser in the reverse thrust position.

A third embodiment of the invention is illustrated in FIGS. 11 and 12. As in the previous embodiments, this embodiment utilizes a thrust reverser door 40 pivotally attached to the cowling 1 so as to pivot about axis 46 between the forward thrust position, illustrated in FIG. 11, and the reverse thrust position, illustrated in FIG. 12. In the forward thrust position, outer door surface 42 is flush with the outer cowling surface to form an aerodynamic contour. Panel 41 is, again, slidably attached to the thrust reverser door 40 such that an outer panel surface is covered by the thrust reverser door 40 when in its forward thrust position. Also, in this position, inner panel surface 43 and inner door surface 44 are substantially flush with each other and with the inner cowling surface to form a smooth, aerodynamic outer boundary for the gas flow duct 15.

When the thrust reverser door 40 pivots into the reverse thrust position, the panel 41 slides linear with respect to the rust reverser door 40 so as to extend forwardly of the front edge portion of the rust reverser door 40, as illustrated in FIG. 12. Again, such relative movement between the panel 41 and the thrust reverser door 40 may be achieved by known devices, such as a known linear actuator, or a known system of linkrods. When in the reverse thrust position, the panel 41 serves to deflect the gases passing through the reverse thrust opening to enhance the reverse thrust effect. Panel 41 may be attached to thrust reverser door 40 by the aforementioned system of rails and grooves, or by other known connecting means which will enable linear movement of the panel 41 relative to the thrust reverser door 40.

The foregoing description is provided for illustrative purposes only and should not be construed as in any way limited this invention, the scope of which is defined solely by the appended claims.

We claim:

1. A thrust reverser for a turbojet engine having a cowling having an inner cowling surface forming an outer boundary of a gas flow duct through which gases flow from a front to a rear, the cowling having an outer cowling surface and at least one reverse thrust opening communicating with the gas flow duct, the thrust reverser comprising:

a) a thrust reverser door pivotally connected to the cowling so as to move between a forward thrust position and a reverse thrust position, the thrust reverser door having front and rear edge portions, an outer door surface and an inner door surface wherein at least one of the outer and inner door surfaces is flush with at least one of the corresponding outer and inner cowling surfaces when the thrust reverser door is in the forward thrust position; and b) at least one thrust reverser panel having an outer panel surface and an inner panel surface, and being mounted on the thrust reverser door so as to move along a linear path of movement relative to the thrust reverser door as the thrust reverser door moves between the forward and reverse thrust positions, such that, when the thrust reverser door is in the forward thrust position the inner panel surface is flush with the inner cowling surface and forms a portion of the boundary of the gas flow duct.

2. The thrust reverser of claim 1 wherein the at least one thrust reverser panel covers at least a portion of the outer door surface when the thrust reverser door is in the forward thrust position.

3. The thrust reverser of claim 2 further comprising a link rod connected to the at least one thrust reverser panel and to the cowling.

4. The thrust reverser of claim 2 wherein the at least one thrust reverser panel is located such that the outer panel surface is flush with the outer cowling surface when the thrust reverser door is in the forward thrust position.

5. The thrust reverser of claim 1 further comprising:

a) a groove formed on one of the thrust reverser door and the at least one thrust reverser panel; and, b) a rail located on the other of the thrust reverser door and the at least one thrust reverser panel and slidably engaging the groove.

6. The thrust reverser of claim 1 further comprising first and second thrust reverser panels mounted on the thrust reverser door, each thrust reverser panel having an inner panel surface flush with the inner cowling surface and forming a portion of the boundary of the gas flow duct when the thrust reverser door is in the forward thrust position.

7. The thrust reverser of claim 6 wherein the first and second thrust reverser panels move in opposite directions with respect to each other as the thrust reverser door moves between its forward and reverser thrust positions.

8. The thrust reverser of claim 1 wherein the at least one thrust reverser panel is located to the rear of the front edge portion of the thrust reverser door when the thrust reverser door is in the forward thrust position and extends forwardly of the front edge portion when the thrust reverser door is in the reverse thrust position.

9. The thrust reverser of claim 1 wherein the outer panel surface is covered by the thrust reverser door when the thrust reverser door is in the forward thrust position.

* * * * *